US012124375B1

(12) United States Patent
Thucanakkenpalayam Sundararajan

(10) Patent No.: US 12,124,375 B1
(45) Date of Patent: Oct. 22, 2024

(54) PREDICTING ALIASING BITS IN A VIRTUALLY INDEXED PHYSICALLY TAGGED CACHE

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 108 days.

(21) Appl. No.: 18/049,580

(22) Filed: Oct. 25, 2022

(51) Int. Cl.
*G06F 12/08* (2016.01)
*G06F 12/0864* (2016.01)
*G06F 12/1045* (2016.01)

(52) U.S. Cl.
CPC ...... *G06F 12/0864* (2013.01); *G06F 12/1054* (2013.01)

(58) Field of Classification Search
CPC ............. G06F 12/1009; G06F 12/1054; G06F 12/0864; G06F 12/1027
See application file for complete search history.

(56) References Cited

U.S. PATENT DOCUMENTS

2019/0227947 A1* 7/2019 Keppel ............... G06F 12/1027

* cited by examiner

*Primary Examiner* — Ernest Unelus
(74) *Attorney, Agent, or Firm* — Park, Vaughan, Fleming & Dowler LLP; Laxman Sahasrabuddhe

(57) ABSTRACT

A second virtual address may be received, where the second virtual address is different from a first virtual address. A second hash value may be computed based on the second virtual address. A first comparison result may be determined by comparing the second hash value with a first hash value, where the first hash value is computed based on the first virtual address. The first comparison result may be used to select a selected structure from either a first structure or a second structure. The selected structure may be used to determine predicted aliasing bits which are used to determine an index corresponding to the second virtual address.

20 Claims, 5 Drawing Sheets

PREDICTING ALIASING BITS IN A VIRTUALLY INDEXED PHYSICALLY TAGGED CACHE

TECHNICAL FIELD

The present disclosure generally relates to integrated circuit (IC) design. More specifically, the present disclosure relates to predicting aliasing bits in a virtually indexed physically tagged cache.

BACKGROUND

Memory systems are widely used in electronics systems, which may include, but are not limited to, computers and smartphones. It is desirable to reduce access times of memory systems.

SUMMARY

Embodiments described herein may feature predicting aliasing bits in a virtually indexed physically tagged cache. A second virtual address may be received, where the second virtual address is different from a first virtual address. A second hash value may be computed based on the second virtual address. A first comparison result may be determined by comparing the second hash value with a first hash value which is computed based on the first virtual address. The first comparison result may be used to select a selected structure from either a first structure or a second structure. The selected structure may be used to determine predicted aliasing bits, which may be used to determine an index corresponding to the second virtual address.

In some embodiments described herein, the first structure may include a set of table entries which is indexed based on the second hash value, where each table entry may include a corresponding set of aliasing bits. The second structure may include a single set of aliasing bits.

In some embodiments described herein, using the first comparison result to select the selected structure from either the first structure or the second structure may include selecting the first structure when the second hash value does not match the first hash value, and selecting the second structure when the second hash value matches the first hash value.

In some embodiments described herein, if the selected structure is the first structure, then using the selected structure to determine the predicted aliasing bits may include selecting a table entry in the set of table entries based on the second hash value and determining the predicted aliasing bits based on the set of aliasing bits in the table entry. If the selected structure is the second structure, then using the selected structure to determine the predicted aliasing bits may include determining the predicted aliasing bits based on the single set of aliasing bits.

In some embodiments described herein, a second physical address may be determined based on the second virtual address. A second comparison result may be determined by comparing the predicted aliasing bits with corresponding bits from the second physical address. The selected structure may be updated based on the second comparison result.

The index corresponding to the second virtual address may be determined based on the predicted aliasing bits. A tag may be selected in a cache directory based on the index. A third comparison result may be determined by comparing the tag with a corresponding tag portion of the second physical address. A cache result may be determined based on the second comparison result and the third comparison result. Specifically, cache result may be a cache hit if the second comparison result and the third comparison result are true, and the cache result may be a cache miss if at least one of the second comparison result or the third comparison result is false.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments described herein feature a system and method for predicting aliasing bits in a virtually indexed physically tagged cache. Memory access time may refer to the amount of time it takes to access memory contents (e.g., instructions or data stored in a memory). A cache memory (hereinafter "cache") may be used between a processor and a main memory to reduce the memory access time. A cache is typically smaller in size than the main memory but has faster access times than the main memory. Specifically, the cache may be used to store memory contents that are currently being used by a processor or are expected to be used by a processor.

In a virtually indexed physically tagged cache, an index may be determined based on a virtual address, and the index may be used to index into the cache. For certain cache sizes, some of the bits (which may be referred to as aliasing bits) of the index may be predicted. Specifically, a hash value may be computed based on the virtual address, and the hash value may be used to predict the aliasing bits. In this disclosure, the term "hash value" generally refers to a value that is generated (e.g., using a function) based on the virtual address. A hash value may have fewer bits than the virtual address. However, predicting the aliasing bits using a hash value may create a deadlock for certain processor operations. Specifically, a processor operation may be implemented using a sequence of processor micro-operations. If two different virtual addresses used by two different processor micro-operations map to the same hash value, then the processor operation may deadlock, i.e., the processor operation may not complete.

Embodiments described herein may use two structures for predicting aliasing bits, where a first structure is used if the virtual addresses map to different hash values, and a second structure is used if the virtual addresses map to the same hash value.

Technical advantages of embodiments described herein include, but are not limited to, improving performance and/or enhancing functionality of a cache, e.g., by preventing deadlock when the cache is accessed by certain sequences of processor micro-operations.

A software program typically uses the virtual address space supported by a processor in a computer system. The virtual address space may be dynamically mapped onto the physical memory of the computer system at runtime. Virtual memory may be divided into equal chunks of consecutive memory locations called virtual pages. Likewise, physical memory may be divided into equal chunks of consecutive memory locations called physical pages. The virtual page size may be equal to the physical page size. Thus, each virtual page may be dynamically mapped to a physical page (or page frame) in main memory.

Figure 1:
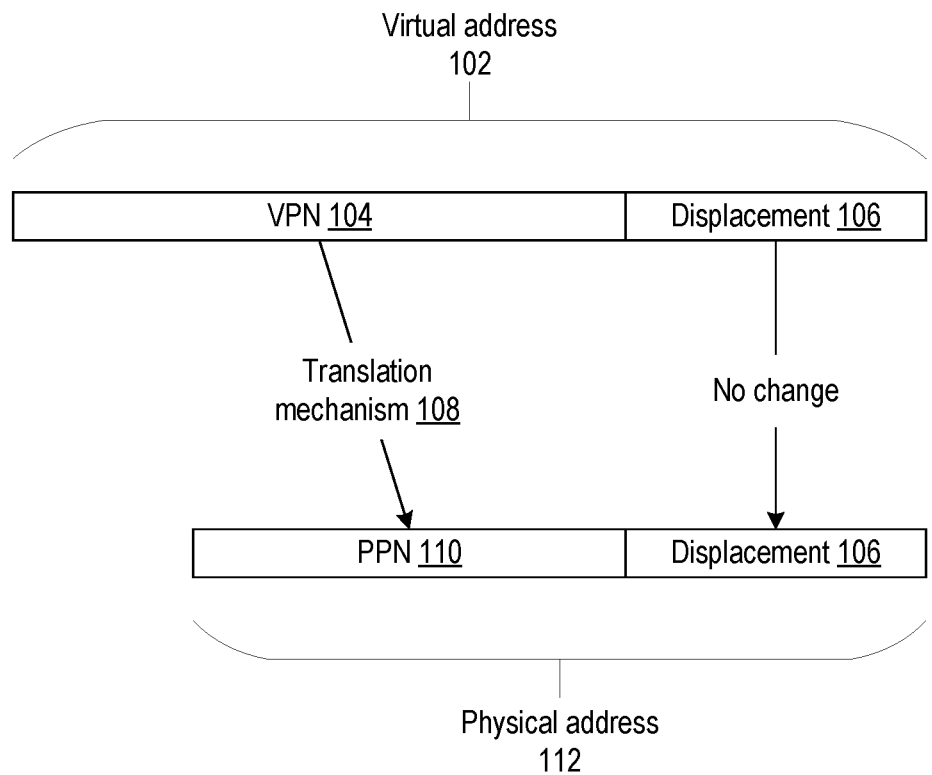
FIG. 1 illustrates translating a virtual address to a physical address in accordance with some embodiments described herein.

FIG. 1 illustrates translating a virtual address to a physical address in accordance with some embodiments described herein.

Virtual address 102 may be partitioned into virtual page number (VPN) 104 which uniquely identifies each virtual page, and displacement 106 which identifies a memory word within a virtual page. Specifically, displacement 106 is an offset within a page. Virtual address 102 may be dynamically mapped to physical address 112. Specifically, the displacement 106 of virtual address 102 may be mapped as-is (i.e., without any changes) to physical address 112. The virtual page number 104 may be mapped to a corresponding physical page number (PPN) 110 using a translation mechanism 108, e.g., a translation lookup buffer (TLB) or a page table. A page table may include multiple entries, where each entry may map a virtual page number to a corresponding physical page number. A TLB may cache page table entries. Address translation may be attempted using the TLB, but if the TLB does not have the desired page, then the page table may be used. As shown in FIG. 1, physical address 112 may include physical page number 110 which uniquely identifies each physical page, and displacement 106 which identifies a memory word within a physical page.

Figure 2:
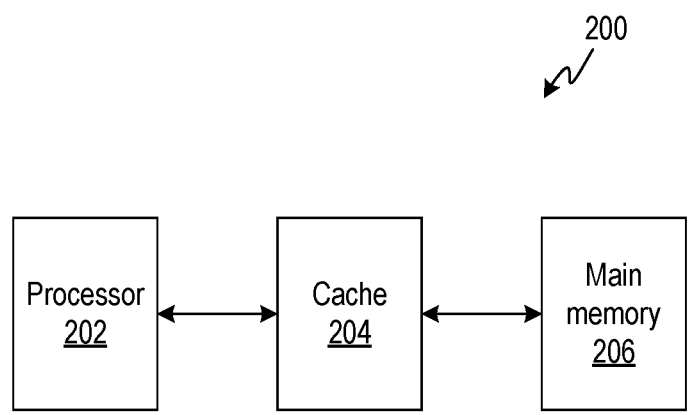
FIG. 2 illustrates an apparatus which includes a cache in accordance with some embodiments described herein.

FIG. 2 illustrates an apparatus which includes a cache in accordance with some embodiments described herein.

In apparatus 200 (e.g., a computer system), cache 204 may be coupled to processor 202 and main memory 206. When the processor 202 accesses a virtual address, cache 204 may be checked to determine if the contents of the virtual address are present in cache 204. If the contents are present in cache 204 (i.e., a cache hit), then cache 204 may provide the contents of the virtual address to processor 202. On the other hand, if the contents of the virtual address are not present in cache 204 (i.e., a cache miss), then the contents of the virtual address may be retrieved from main memory 206 by using the physical address (which may be obtained by performing address translation on the virtual address) and may be stored in cache 204 for future access.

Each physical address in the main memory may store a single word of data. A unit of storage in a cache may be referred to as a cache entry, a cache block, or a cache line. A cache may store multiple cache entries, and each cache entry may include one or more words of data. A cache entry may be looked up based on one or more bits of a virtual address. Each cache entry may be associated with a tag. Specifically, a cache may include two structures: a first structure which stores the cache entries, and a second structure (which may be referred to as the cache directory) which stores tags associated with the cache entries.

Figure 3:
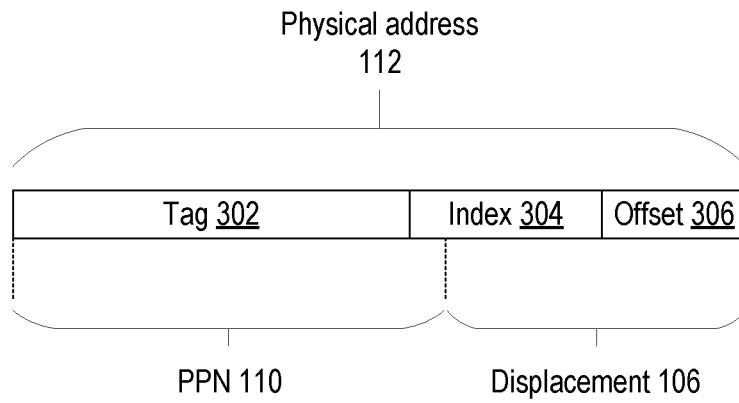
FIG. 3 illustrates partitioning a physical address into a tag, index, and offset in accordance with some embodiments described herein.

FIG. 3 illustrates partitioning a physical address into a tag, index, and offset in accordance with some embodiments described herein.

Physical address 112 may be partitioned into three non-overlapping portions: tag 302, index 304, and offset 306. For example, if physical address 112 has m bits, e.g., A[m−1:0], where A[0] is the least significant bit, and A[m−1] is the most significant bit, then offset 306 may correspond to p bits A[p−1:0], index 304 may correspond to q bits A[p+q−1:p], and tag 302 may correspond to r bits A[p+q+r−1:p+q], where p+q+r=m.

The index 304 portion of the physical address 112 may be used to identify a cache entry and a tag which corresponds to the cache entry. The tag 302 portion of the physical address 112 may be compared with the tag corresponding to the cache entry. If the tag 302 portion of the physical address 112 matches the tag corresponding to a cache entry (i.e., a cache hit), then a word in the cache entry may be selected based on the offset 306 and provided to the processor (e.g., processor 202). On the other hand, if the tag 302 portion of the physical address 112 does not match the tag corresponding to the cache entry (i.e., a cache miss), then the contents of the physical address 112 may be retrieved from the main memory (e.g., main memory 206).

In a virtually indexed physically tagged cache, the index bits are determined based on the virtual address (e.g., virtual address 102). If the index bits 304 only include bits from the displacement portion of the virtual address (e.g., displacement 106 portion in virtual address 102), then all index bits 304 can be determined based on the virtual address (e.g., virtual address 102) because the displacement portion is the same in the virtual address and the physical address. However, if the index bits include bits from the physical page number (e.g., physical page number 110), then those bits may need to be predicted because those bits may be different in the virtual address and the physical address. For example, as shown in FIG. 3, index 304 may include bits from displacement 106 and may include bits from physical page number 110.

Figure 4:
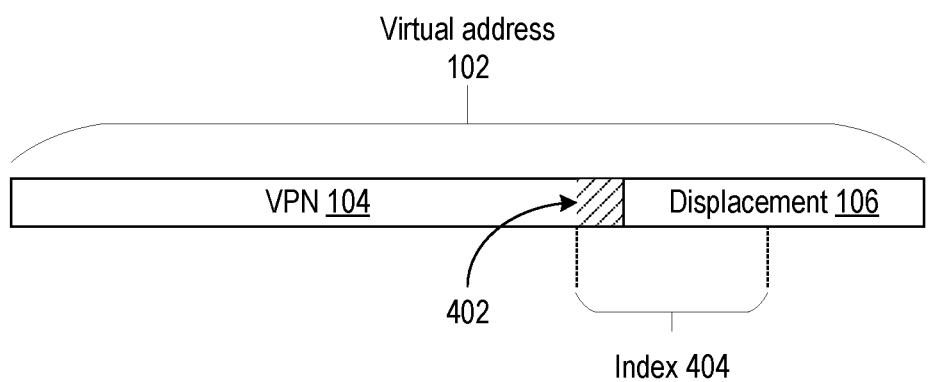
FIG. 4 illustrates aliasing bits of an index that may need to be predicted in accordance with some embodiments described herein.

FIG. 4 illustrates aliasing bits of an index that may need to be predicted in accordance with some embodiments described herein.

Index 404 may include bits from displacement 106 which are the same in virtual address 102 and physical address 112. However, bits 402 in index 404 may be different in virtual address 102 and physical address 112. Thus, bits 402 in the virtual page number 104 cannot be used as-is in the index. Bits 402 may be referred to as aliasing bits. In some embodiments described herein, bits 402 in index 404 may be predicted based on virtual address 102 or a portion thereof (e.g., virtual page number 104).

Figure 5:
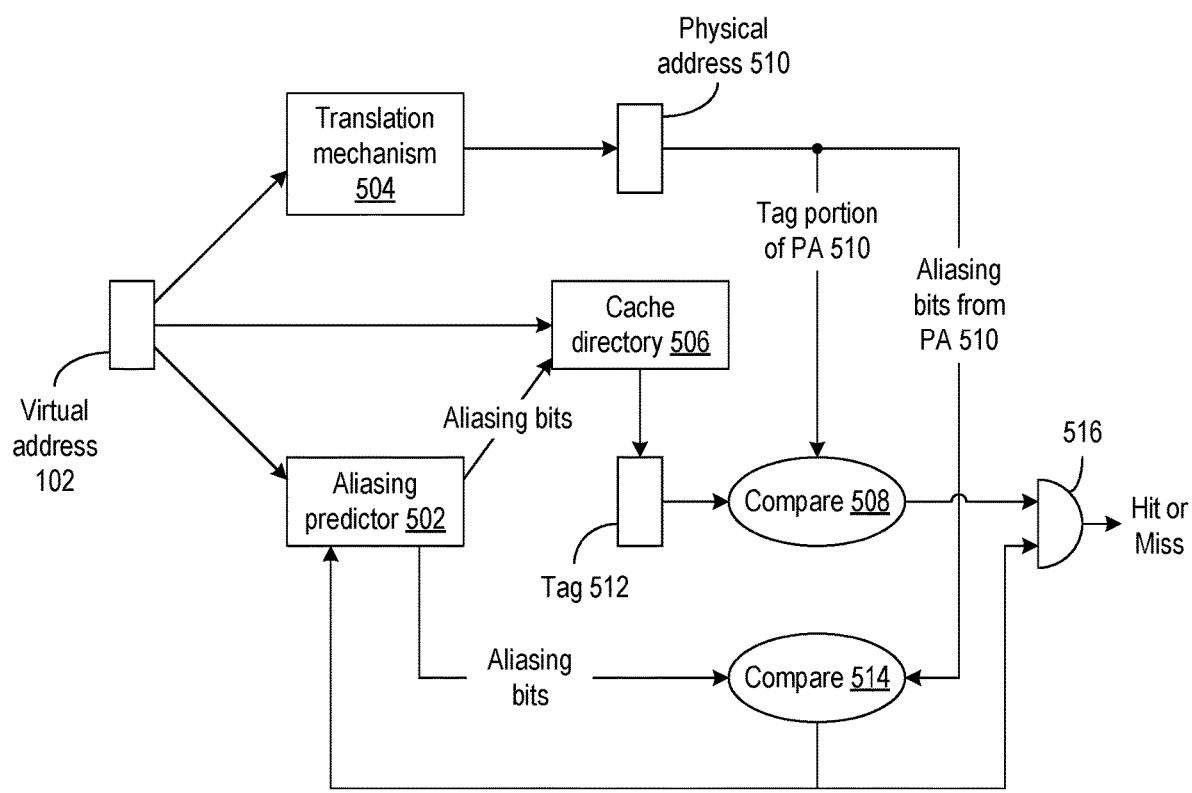
FIG. 5 illustrates predicting aliasing bits in a virtually indexed physically tagged cache in accordance with some embodiments described herein.

FIG. 5 illustrates predicting aliasing bits in a virtually indexed physically tagged cache in accordance with some embodiments described herein.

A virtual address (e.g., virtual address 102) may be provided to a translation mechanism 504 (e.g., a TLB or page table), cache directory 506, and aliasing predictor 502. Aliasing predictor 502 may be implemented in hardware, e.g., using a circuit. Translation mechanism 504 may determine physical address 510 based on the virtual address 102. Aliasing predictor 502 may predict aliasing bits based on virtual address 102. Cache directory 506 may determine an index based on virtual address 102 and the aliasing bits predicted by aliasing predictor 502. Cache directory 506 may then determine tag 512 based on the index.

The tag portion of physical address 510 (which was determined by translation mechanism 504) may be compared with the tag 512 which was determined by the cache directory 506 (at 508). If the tags match, then comparison 508 may provide a true indicator value (e.g., a logic 1); on the other hand, if the tags do not match, then comparison 508 may provide a false indicator value (e.g., a logic 0). Additionally, aliasing bits from physical address 510 may be compared with the aliasing bits predicted by aliasing predictor 502 (at 514). If the aliasing bits match, then comparison 514 may provide a true indicator value (e.g., a logic 1); on the other hand, if the aliasing bits do not match, then comparison 514 may provide a false value (e.g., a logic 0).

A cache status may be determined based on the results provided by comparisons 508 and 514. Specifically, a cache state may be determined by performing a conjunction (e.g., AND operation 516) of the results from comparisons 508 and 514. Specifically, if both comparisons 508 and 514 return a true value, then a cache hit may be determined. On the other hand, if either or both comparisons 508 and 514 return a false value, then cache miss may be determined.

A result of comparison 514 may also be provided to aliasing predictor 502. Specifically, if the aliasing bits in physical address 510 are equal to the aliasing bits predicted by aliasing predictor 502, then no change may be made to aliasing predictor 502. On the other hand, if the aliasing bits in physical address 510 are not equal to the aliasing bits predicted by aliasing predictor 502, then the aliasing predictor 502 may be updated to store the aliasing bits in physical address 510. Specifically, a table entry in aliasing predictor 502 which corresponds to virtual address 102 may be updated to store the aliasing bits in physical address 510.

Figure 6:
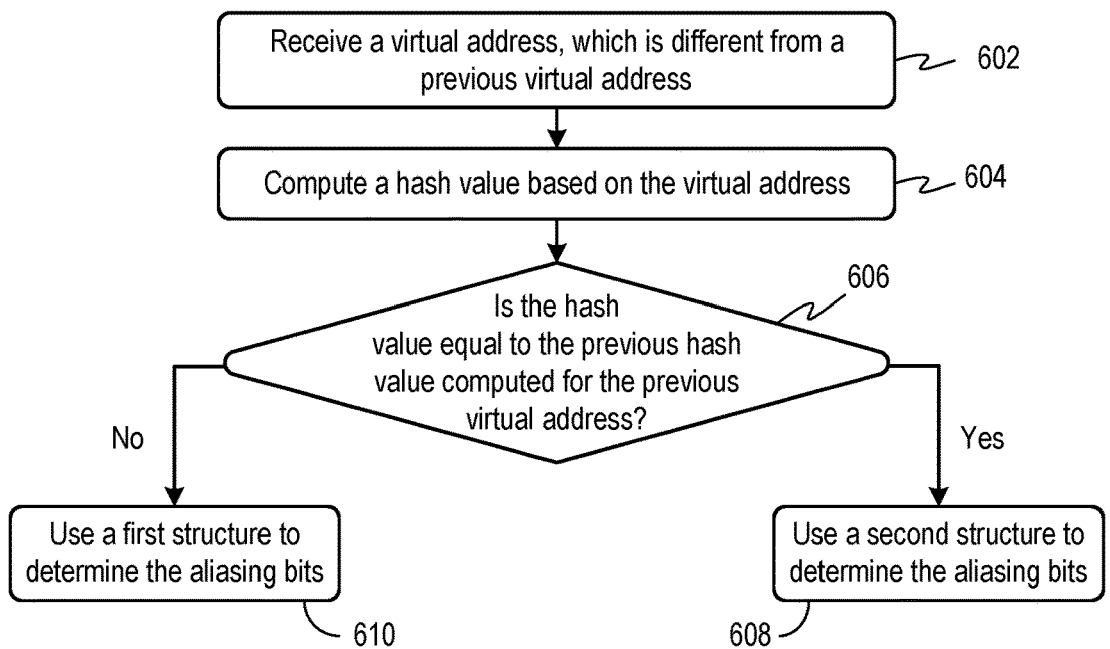
FIGS. 6-7 illustrate a process for using a first structure and a second structure to predict aliasing bits in accordance with some embodiments described herein.
Figure 7:
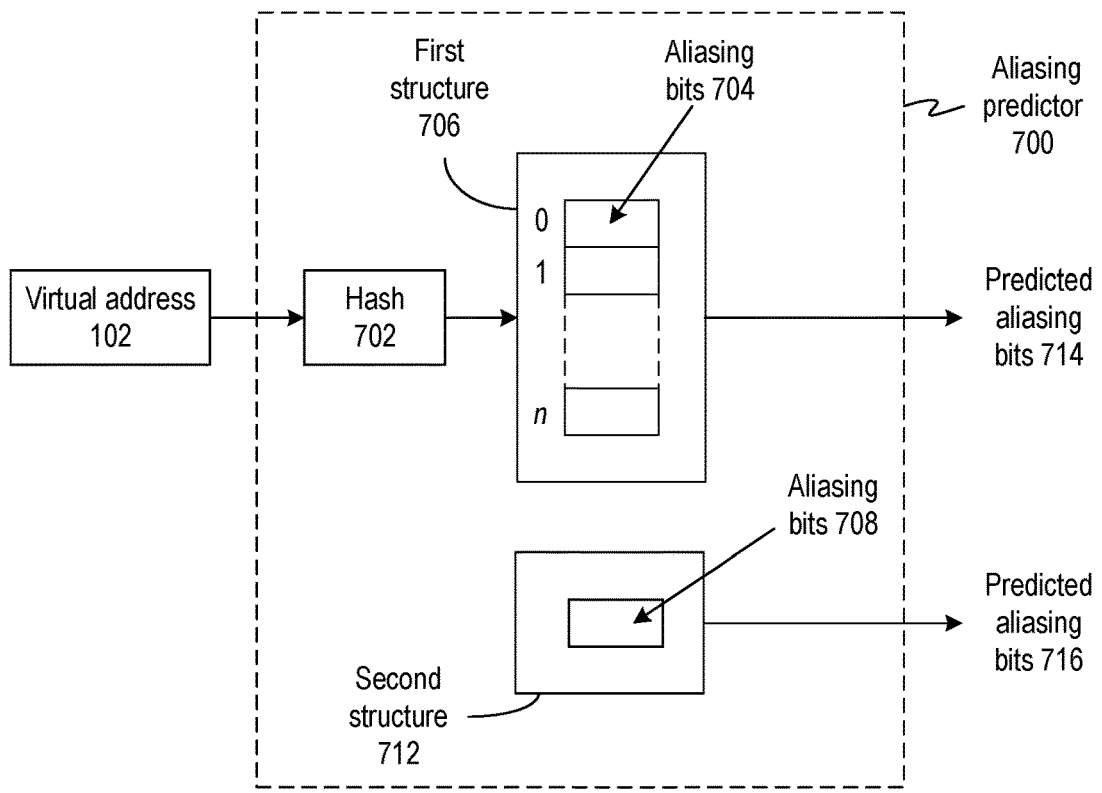

FIGS. 6-7 illustrate a process for using a first structure and a second structure to predict aliasing bits in accordance with some embodiments described herein.

In FIG. 6, a current virtual address may be received, which may be different from a previous virtual address (at 602). For example, a second virtual address may be received after a first virtual address, where the second virtual address is different from the first virtual address.

A hash value may be computed based on the current virtual address (at 604). For example, a second hash value may be computed based on the second virtual address, where a first hash value may have been computed previously based on the first virtual address.

It may be determined if the hash value is equal to the previous hash value computed for the previous virtual address (at 606). For example, the second hash value may be compared with the first hash value to determine if the second hash value is equal to the first hash value.

If the hash value is not equal to the previous hash value ("No" branch from 606), then a first structure may be used to determine aliasing bits (at 610). Specifically, in aliasing predictor 700, first structure 706 may include a table having multiple table entries, where each table entry includes aliasing bits (e.g., aliasing bits 704). The table in first structure 706 may be indexed using hash value 702, which may be computed based on a virtual address, e.g., virtual address 102.

For example, suppose the virtual address space is 32 bits, e.g., the virtual address is A[31:0]. The displacement portion of the virtual address may be 12 bits, e.g., A[11:0]. The remaining virtual address bits, i.e., A[31:12] may be provided as input to a hashing function to generate hash value 702. For example, suppose the table in first structure 706 includes 16 entries. Thus, a four-bit hash value may be used to index into the table. In some embodiments described herein, the following hash function may be used to generate a four-bit hash value: {A[12], A[14], A[16], A[18]}^{A[20], A[22], A[24], A[26]}^{A[28], A[30], 1'b1, 1'b1}^{A[13], A[15], A[17], A[19]}^{A[21], A[23], A[25], A[27]}^{A[29], A[31], 1'b1, 1'b1}, where the caret (^) symbol represents a four-bit exclusive-OR operation, and bits enclosed by curly braces denote a four-bit value. For example, {A[12], A[14], A[16], A[18]} is a four bit value where the least significant bit is A[18] and the most significant bit is A[12].

On the other hand, if the hash value is equal to the previous hash value ("Yes" branch from 606), then a second structure may be used to determine aliasing bits (at 608). Specifically, as shown in FIG. 7, second structure 712 may include a single entry of aliasing bits (e.g., aliasing bits 708).

In other words, when a virtual address (e.g., virtual address 102) is received, a hash value may be computed (e.g., hash 702). If the hash value is not equal to the previous hash value ("No" branch from 606), then the hash value (e.g., hash 702) may be used to index into a first structure (e.g., first structure 706), and the aliasing bits in the entry corresponding to the hash value (e.g., hash 702) may be provided as the predicted aliasing bits 714. On the other hand, if the hash value (e.g., hash 702) is equal to the previous hash value ("Yes" branch from 606), then the aliasing bits (e.g., aliasing bits 708) stored in a second structure (e.g., second structure 712) may be provided as the predicted aliasing bits 716. Thus, some embodiments may select a selected structure from either a first structure (e.g., first structure 706) or a second structure (e.g., second structure 712) based on a result of comparing a first hash value (e.g., hash 702) with a second hash value (e.g., the previous hash value), and then use the selected structure to determine the predicted aliasing bits.

In some embodiments described herein, a physical address may be determined based on the virtual address (e.g., using translation mechanism 504). A comparison result may be determined by comparing the predicted aliasing bits with corresponding bits from the physical address (e.g., comparison 514). An entry in the first structure or the second structure may be updated based on the comparison result (e.g., updating aliasing predictor 502 based on result of comparison 514).

The index corresponding to the virtual address may be determined based on the predicted aliasing bits. A tag may be selected in a cache directory based on the index (e.g., cache directory 506 may select tag 512 based on the index). A comparison result may be determined by comparing the tag with a corresponding tag portion of the physical address (e.g., comparison 508). A cache result may be determined based on the two comparison results. Specifically, cache result may be a cache hit if the second comparison result and the third comparison result are true, and the cache result may be a cache miss if at least one of the second comparison result and the third comparison result is false (e.g., AND operation 516).

In some embodiments, if a first hash value corresponding to a first virtual address matches a second hash value corresponding to a second virtual address, then the decision to use the first structure or the second structure may depend on one or more bits from the physical address or program counter. For example, in some embodiments, the virtual address which maps to an even physical page number (or an even program counter) may use the first structure and the virtual address which maps to an odd physical page number (or an odd program counter) may use the second structure.

Figure 8:
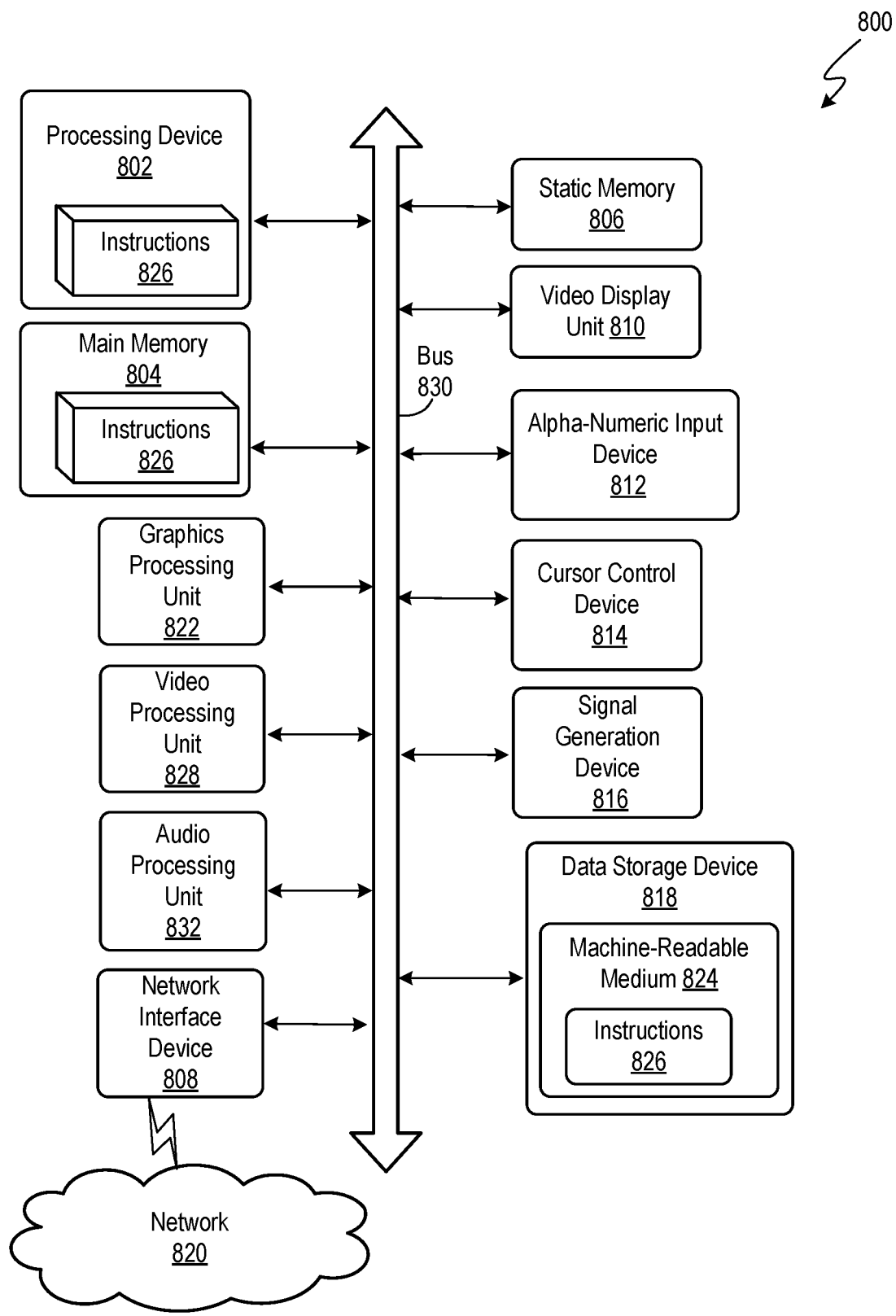
FIG. 8 illustrates an example machine of a computer system within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a second virtual address which is different from a first virtual address;
   computing a second hash value based on the second virtual address;
   determining a first comparison result by comparing the second hash value with a first hash value which is computed based on the first virtual address;
   using the first comparison result to select a selected structure from either a first structure or a second structure, wherein the first structure and the second structure store aliasing bits; and
   using the selected structure to determine predicted aliasing bits which are used to determine an index corresponding to the second virtual address, wherein the index is used to select a tag in a cache directory, and wherein at least one bit in the index corresponds to at least one bit in a physical page number.

2. The method of claim 1, wherein the first structure includes a set of table entries which is indexed based on the second hash value, wherein each table entry includes a corresponding set of aliasing bits, and wherein the second structure includes a single set of aliasing bits.

3. The method of claim 2, wherein the using the first comparison result to select the selected structure from either the first structure or the second structure comprises:
   selecting the first structure as the selected structure when the second hash value does not match the first hash value; and
   selecting the second structure as the selected structure when the second hash value matches the first hash value.

4. The method of claim 2, wherein if the selected structure is the first structure, the using the selected structure to determine the predicted aliasing bits comprises:
   selecting a table entry in the set of table entries based on the second hash value; and
   determining the predicted aliasing bits based on the set of aliasing bits in the table entry.

5. The method of claim 2, wherein if the selected structure is the second structure, the using the selected structure to determine the predicted aliasing bits comprises determining the predicted aliasing bits based on the single set of aliasing bits.

6. The method of claim 1, further comprising:
   determining a second physical address based on the second virtual address;
   determining a second comparison result by comparing the predicted aliasing bits with corresponding bits from the second physical address; and
   updating the selected structure based on the second comparison result.

7. The method of claim 6, further comprising:
   determining the index corresponding to the second virtual address based on the predicted aliasing bits;
   selecting the tag in the cache directory based on the index;
   determining a third comparison result by comparing the tag with a corresponding tag portion of the second physical address; and
   determining a cache result based on the second comparison result and the third comparison result.

8. The method of claim 7, wherein the cache result is a cache hit if the second comparison result and the third comparison result are true.

9. The method of claim 7, wherein the cache result is a cache miss if at least one of the second comparison result and the third comparison result is false.

10. An integrated circuit (IC), comprising:
    a first circuit to compute a second hash value based on a second virtual address, wherein the second virtual address is different from a first virtual address;
    a second circuit to determine a first comparison result by comparing the second hash value with a first hash value which is computed based on the first virtual address;
    a third circuit to use the first comparison result to select a selected structure from either a first structure or a second structure, wherein the first structure and the second structure store aliasing bits; and
    a fourth circuit to use the selected structure to determine predicted aliasing bits which are used to determine an index corresponding to the second virtual address, wherein the index is used to select a tag in a cache directory, and wherein at least one bit in the index corresponds to at least one bit in a physical page number.

11. The IC of claim 10, wherein the first structure includes a set of table entries which is indexed based on the second hash value, wherein each table entry includes a corresponding set of aliasing bits, and wherein the second structure includes a single set of aliasing bits.

12. The IC of claim 11, wherein the third circuit selects the first structure as the selected structure when the second hash value does not match the first hash value and selects the second structure as the selected structure when the second hash value matches the first hash value.

13. The IC of claim 11, wherein if the selected structure is the first structure, the fourth circuit selects a table entry in the set of table entries based on the second hash value and determines the predicted aliasing bits based on the set of aliasing bits in the table entry.

14. The IC of claim 11, wherein if the selected structure is the second structure, the fourth circuit determines the predicted aliasing bits based on the single set of aliasing bits.

15. The IC of claim 10, further comprising:
    a fifth circuit to determine a second physical address based on the second virtual address;

a sixth circuit to determine a second comparison result by comparing the predicted aliasing bits with corresponding bits from the second physical address; and
a seventh circuit to update the selected structure based on the second comparison result.

16. The IC of claim 15, further comprising:
an eighth circuit to determine the index corresponding to the second virtual address based on the predicted aliasing bits;
a ninth circuit to select the tag in the cache directory based on the index;
a tenth circuit to determine a third comparison result by comparing the tag with a corresponding tag portion of the second physical address; and
an eleventh circuit to determine a cache result based on the second comparison result and the third comparison result.

17. The IC of claim 16, wherein the cache result is a cache hit if the second comparison result and the third comparison result are true.

18. The IC of claim 16, wherein the cache result is a cache miss if at least one of the second comparison result and the third comparison result is false.

19. An apparatus, comprising:
a processor;
a main memory;
a first circuit to compute a second hash value based on a second virtual address received from the processor, wherein the second virtual address is different from a first virtual address;
a second circuit to determine a first comparison result by comparing the second hash value with a first hash value which is computed based on the first virtual address;
a third circuit to use the first comparison result to select a selected structure from either a first structure or a second structure, wherein the first structure and the second structure store aliasing bits;
a fourth circuit to use the selected structure to determine predicted aliasing bits which are used to determine an index corresponding to the second virtual address, wherein the index is used to select a tag in a cache directory, and wherein at least one bit in the index corresponds to at least one bit in a physical page number;
a fifth circuit to determine a second physical address based on the second virtual address, wherein the second physical address corresponds to a memory location in the main memory;
a sixth circuit to determine a second comparison result by comparing the predicted aliasing bits with corresponding bits from the second physical address; and
a seventh circuit to update the selected structure based on the second comparison result.

20. The apparatus of claim 19, further comprising:
an eighth circuit to determine the index corresponding to the second virtual address based on the predicted aliasing bits;
a ninth circuit to select the tag in the cache directory based on the index;
a tenth circuit to determine a third comparison result by comparing the tag with a corresponding tag portion of the second physical address; and
an eleventh circuit to determine a cache result based on the second comparison result and the third comparison result.

* * * * *